(12) United States Patent
Endo et al.

(10) Patent No.: US 7,161,542 B2
(45) Date of Patent: Jan. 9, 2007

(54) ANTENNA FOR RFID

(75) Inventors: Takanori Endo, Saitama (JP); Tadashi Yonezawa, Saitama (JP); Seirou Yahata, Funabashi (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 10/433,606

(22) PCT Filed: Dec. 18, 2001

(86) PCT No.: PCT/JP01/11078

§ 371 (c)(1),
(2), (4) Date: Nov. 10, 2003

(87) PCT Pub. No.: WO02/50951

PCT Pub. Date: Jun. 27, 2002

(65) Prior Publication Data

US 2004/0075616 A1 Apr. 22, 2004

(30) Foreign Application Priority Data

Dec. 18, 2000 (JP) .............................. 2000-383102
Dec. 3, 2001 (JP) .............................. 2001-368241

(51) Int. Cl.
*H01Q 1/24* (2006.01)
(52) U.S. Cl. ...................................... 343/702; 343/895
(58) Field of Classification Search ................. 343/702, 343/700 MS, 895, 866, 867, 873
See application file for complete search history.

(56) References Cited

U.S. PATENT DOCUMENTS

| | | | |
|---|---|---|---|
| 3,621,484 A | * 11/1971 | Shult | 333/202 |
| 5,698,840 A | 12/1997 | Jurisch et al. | 235/493 |
| 6,034,651 A | 3/2000 | Enguent | 343/895 |
| 6,117,539 A | 9/2000 | Crotzer et al. | 428/317.9 |
| 6,147,604 A | 11/2000 | Wiklof et al. | 340/572.1 |
| 6,259,408 B1 | * 7/2001 | Brady et al. | 343/700 MS |
| 6,265,977 B1 | * 7/2001 | Vega et al. | 340/572.7 |
| 6,278,413 B1 | * 8/2001 | Hugh et al. | 343/818 |
| 6,353,420 B1 | * 3/2002 | Chung | 343/895 |
| 6,371,380 B1 | 4/2002 | Tanimura | 235/492 |
| 6,421,013 B1 | * 7/2002 | Chung | 343/700 MS |

FOREIGN PATENT DOCUMENTS

| | | |
|---|---|---|
| EP | 0 782 214 A1 | 7/1997 |
| JP | 58-94204 | 6/1983 |
| JP | 59-119801 | 7/1984 |
| JP | 60-233904 | 11/1985 |
| JP | 6-59046 | 3/1994 |

(Continued)

OTHER PUBLICATIONS

U.S. Appl. No. 10/433,606, filed Nov. 10, 2003, Endo et al.

(Continued)

Primary Examiner—Hoang V. Nguyen
Assistant Examiner—Huedung Mancuso
(74) Attorney, Agent, or Firm—Oblon, Spivak, McClelland, Maier & Neustadt, P.C.

(57) ABSTRACT

An antenna for RFID (Radio Frequency Identification) configured to be electrically connected to an IC (Integrated Circuit) chip or capacitor and configured to be affixed to an article. The antenna includes: a planar conductive member having a first side configured to be mounted on the article; and a coil body configured with coil turns and mounted on or at a second side which is opposite to the first side of the conductive member. The number of the coil turns and diameter of the coil body are adjusted such that a characteristic of said coil body has a predetermined value. The conductive member shields the coil body from the article.

18 Claims, 4 Drawing Sheets

FOREIGN PATENT DOCUMENTS

| | | |
|---|---|---|
| JP | 7-263936 | 10/1995 |
| JP | 9-284038 | 10/1997 |
| JP | 10-294586 | 11/1998 |
| JP | 11-26977 | 1/1999 |
| JP | 11-239016 | 8/1999 |
| JP | 2000-113142 | 4/2000 |
| JP | 2000-172335 | 6/2000 |

OTHER PUBLICATIONS

U.S. Appl. No. 10/500,457, filed Jul. 13, 2004, Endo et al.

* cited by examiner

ANTENNA FOR RFID

This application is the National Phase International Application PCT/JP01/11078, filed Dec. 18, 2001.

TECHNICAL FIELD

The present invention relates to an antenna used for a tag using the RFID (Radio Frequency Identification) technique. More particularly, the present invention relates to an antenna for RFID which has a spiral coil and will be set to an article.

BACKGROUND ART

A tag is known which has an antenna and an IC chip, storing information about an article to be managed, electrically connected to the antenna, as a tag using the RFID technique. By transmitting radio waves at a predetermined frequency to the antenna from the transceiving antenna of an interrogator, the tag is activated, data is read from the IC chip in accordance with a read command through data communication by radio waves, and data is written in the IC chip in accordance with a write command. Moreover, a 1-bit RFID used for simplest EAS (Electronic Article Surveillance) is constituted by a capacitor and an antenna, which resonates by receiving a predetermined frequency and detects presence or absence of an article under surveillance.

In order to minimize the thickness of the tag, the above conventional antenna for RFID used for the tag uses an antenna formed by forming a conductive wire whose surface is covered with an insulating layer into a nearly squared spiral and attaching it to a base plate or an antenna which is spiral by removing unnecessary portions of a conductive layer formed by an aluminum foil or copper foil through etching or punching. In the case of a tag having the above antenna, when an article to be managed is made of a metal, the tag is affixed to the article by using a machine screw or the like while inserting a spacer having a thickness of 5 to 10 mm and electrical insulating properties between the tag and article in order to avoid the influences of the metallic article.

However, in the case of the above conventional tag, because the spacer has a relatively large thickness, the interval between the metallic article and tag becomes relatively large, even if the thickness of the antenna can be decreased, and a problem thereby occurs in that the tag greatly protrudes from the article to be managed. Therefore, the tag may contact a neighboring object while the article is being transported.

It is an object of the present invention to provide an antenna for RFID which can be directly affixed to an article to be managed, without using a spacer, no matter the kind of material making up the surface of the article.

DISCLOSURE OF THE INVENTION

The present invention relates to improvement of an antenna for RFID to be affixed to an article electrically connected to an IC chip. The antenna for RFID has a conductive member which is formed into a flat plate and whose back will be affixed to an article and a coil body which is made spiral so as to face the conductive member and at least one of the number of turns and the spiral diameter thereof is adjusted so as to obtain a predetermined characteristic value when the coil body is made spiral.

In the case of an antenna for RFID of the present invention, the body of a coil is adjusted so that a predetermined characteristic value can be obtained when the body of the coil is wound on the surface of a conductive member. Therefore, it is possible to reliably activate a tag by transmitting radio waves at a predetermined frequency to the antenna for RFID from the transceiving (transmitting and/or receiving) antenna of an interrogator. Moreover, in the case of this antenna, because the body of the coil is already wound on the front of the conductive member and the predetermined characteristic value is obtained, the antenna is not influenced by the metal in an article to be managed even if the antenna is directly affixed to the article, and the characteristic value of the coil body is therefore not changed extremely. Thus, a spacer, which has required to affix an antenna to a metallic article, is unnecessary, and it is possible to avoid the tag greatly protruding from an article to be managed.

In this case, it is preferable that a conductive member use a sheet, plate, foil, or spiral conductor whose both ends are connected to each other and that the electrical resistance between longitudinal-directional both ends of the conductive member having a width of 1 cm and a length of 1 cm be 5Ω or less. In this case, it is possible for the electrical resistance to be equal to a value of 5Ω or less obtained by changing the material and thickness of the conductive member and dividing the specific electric resistance (electric resistivity) by the thickness, and it is possible to optionally select the material and thickness of the conductive member.

Moreover, it is possible for the conductive member to use a conductive paint film formed by applying a conductive ink to the back of a sheet, plate, or foil made of a nonconductive material such as polyethylene or polyethylene terephthalate and a conductive metal plating or deposited layer made of Cu or Al layered on the back of the sheet, plate, or foil of the nonconductive material. In this case, it is preferable to set the gap between the conductive member and coil body to 0.01 to 5 mm by using a sheet, plate, or foil with a thickness of 0.01 to 5 mm.

Moreover, it is possible to form a hole at a portion of the conductive member surrounded by the coil body and to set a soft magnetic member between the conductive member and coil body. When forming a hole on the conductive member corresponding the central portion of the coil body, even if an eddy current is generated on the conductive member due to radio waves passing through the coil body, the eddy current is generated in a small range close to the coil body, and thus, it is possible to prevent the Q value of the coil body from decreasing. Furthermore, when an object to be set is made of an insulating material or a material allowing electromagnetic waves to pass through, such as a metallic deposited film, it is also possible to use electromagnetic waves passing through the hole of the conductive member, and thereby, the sensitivity of the tag is improved. Alternatively, when setting a soft magnetic member between the conductive member and coil body, because magnetic fluxes of the electromagnetic waves flow through the soft magnetic member at a high density, a desired sensitivity can be obtained even if the interval between the conductive member serving as an electric conductor and the coil body serving as a coil is small. Moreover, it is allowed that the number of turns and/or spiral diameter of a coil for obtaining a predetermined inductance is small and the Q value is also improved.

Furthermore, an antenna for RFID in a second aspect of the present invention has a soft magnetic member which is formed into a flat plate and whose back will be set to an article and a coil body whose number of turns and/or spiral diameter is adjusted so as to obtain a predetermined characteristic value while it is spiral and affixed to the surface of the soft magnetic member.

In the case of the antenna for RFID of the second aspect of the present invention, by transmitting radio waves while setting the antenna on an article formed of metal, a soft magnetic member prevents radio waves from passing through a metallic portion and thereby, no eddy current is generated on the metallic portion. As a result, a tag is activated, a spacer has been previously required is unnecessary, and it is possible to prevent the antenna from contacting with a neighboring object when the article is transported.

In the case of a soft magnetic member, it is preferable that the product of the magnetic permeability and the thickness shown in millimeters of the soft magnetic member be 0.5 or more. Moreover, it is preferable that a soft magnetic member be formed by a soft magnetic material of any one of a rapidly solidifying material, casting material, rolling material, forging material, and sintering material of an amorphous alloy, permalloy, magnetic steel, sillicon steel, sendust alloy, Fe—Al alloy, or soft-magnetic ferrite. Furthermore, it is possible for the soft magnetic member to be a composite material of fine particles or flakes of a metal or ferrite and plastic or rubber, or a paint film containing fine particles of flakes of a metal or ferrite. Furthermore, it is possible for a soft magnetic member to be an adhesion sheet obtained by adhering a plurality of flakes made of a metal or soft-magnetic ferrite to the surface of a base-material sheet made of plastic so that the flakes closely contact with each other. Furthermore, it is possible to use a laminated sheet obtained by arranging a plurality of flakes made of a metal or soft-magnetic ferrite on the surface of a base-material sheet made of plastic so that the flakes closely contact each other, covering the flakes with a cover sheet made of plastic, and adhering the base-material sheet and the cover sheet together.

BEST MODE FOR CARRYING OUT THE INVENTION

Now, the first embodiment of the present invention is described below with reference to the accompanying drawings.

Figure 1:
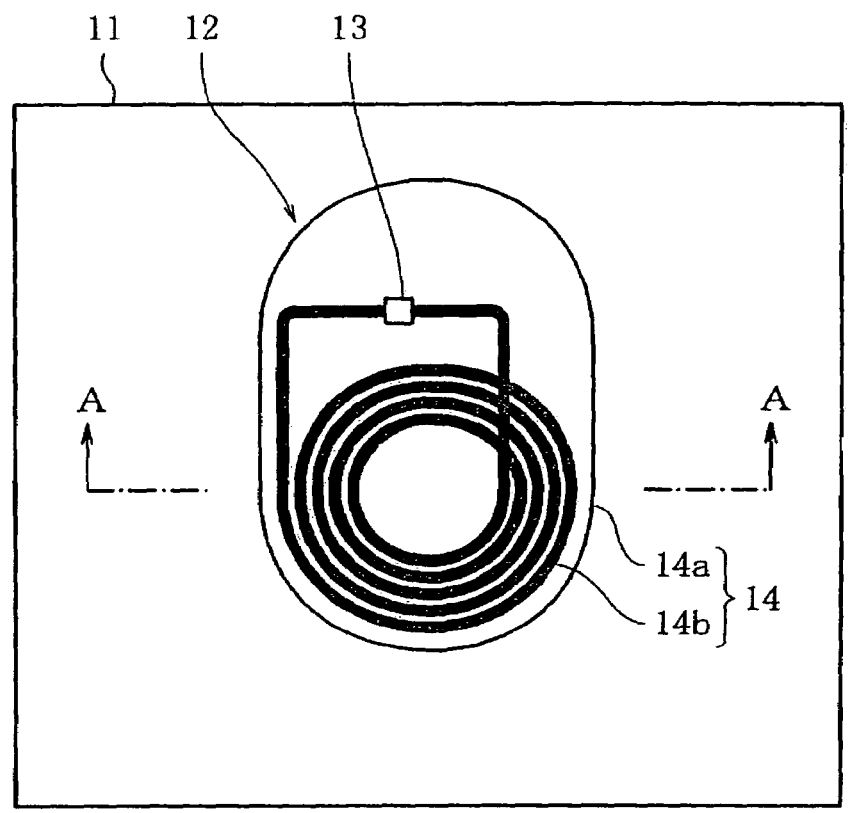
FIG. 1 is a top view of a tag including an antenna for RFID of a first embodiment of the present invention.
Figure 2:
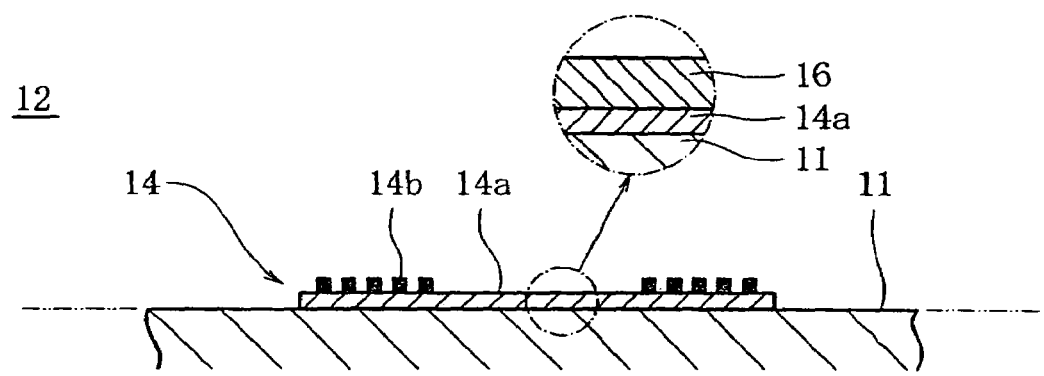
FIG. 2 is a sectional view taken along the line A—A of FIG. 1.

As shown in FIGS. 1 and 2, an RFID tag 12 is affixed to the surface of an article 11 and the tag 12 has an IC chip 13 storing specific information which differs for every article 11 and an antenna for RFID 14 electrically connected to the IC chip 13. In the case of the article 11 of this embodiment, to a portion of which a tag is affixed is formed by a metallic material. The antenna 14 of the present invention has a conductive member 14a formed into a flat plate by a conductive material is mounted on the article 11 at its back and a coil body 14b formed spirally at the front side of the conductive member 14a.

The conductive member 14a uses a sheet, plate, or foil made of a conductive material such as copper or aluminum and it is possible to use a spiral electric conductor whose both ends are connected to each other. Moreover, as long as the conductive member 14a has conducting properties, it is possible for the member 14a to be a conductive paint film obtained by applying a conductive ink to the back of a nonconductive sheet, plate, or foil 16 made of polyethylene or polyethylene terephthalate and drying it as shown in the enlarged view in FIG. 2. It is preferable that a conductive paint contain particles or flakes of silver or graphite. Furthermore, it is possible for the conductive member 14a to be a conductive metal plating layer or deposited film laminated on the back of the nonconductive sheet, plate, or foil 16. When using the conductive member 14a made of a paint film, metal plating, or deposited layer, it is preferable that the nonconductive sheet, plate or foil 16 have a thickness of 0.01 to 5 mm. By setting the thickness of the sheet, plate, or foil 16 to 0.01 to 5 mm, the interval between the conductive member 14a and coil body 14b increases, and it is possible to improve the Q value of the coil body 14b and the performance as an antenna. Moreover, it is preferable that the electric resistance for a width of 1 cm and length of 1 cm of the conductive member 14a be 5Ω or less.

The spiral coil body 14b uses a conventional coil body having been used so far. That is, the coil body 14b is formed by winding a coated copper wire or uses a coil body formed by removing unnecessary portions of a conductive layer such as an aluminum foil or copper foil laminated on an insulating plastic sheet through etching or thin-plate punching and forming a spiral. When the coil body 14b is formed by an aluminum foil or copper foil, it is necessary to fix the coil body 14b to the front of the conductive member 14a through an insulating film (not shown) in order to prevent the coil body 14b from being electrically connected with the conductive member 14a. Moreover, when the conductive member 14a is formed by a nonconductive sheet, plate, or foil and a paint film, metal plating, or deposited layer formed on the back of the sheet, plate, or foil, it is allowed to directly laminate an aluminum foil or copper foil on the surface of the nonconductive sheet, plate, or foil, remove unnecessary portions of the aluminum or copper foil through etching, and directly form the spiral coil body 14b on the surface of the aluminum or copper foil. The coil body 14b is formed by adjusting the number of turns and/or spiral diameter of the coil body 14b so that a predetermined characteristic value can be secured while the coil body 14b is wound on the front of the conductive member 14a. The IC chip 13 of this embodiment is directly adhered onto the conductive member 14a while it is connected to both ends of the coil body 14b.

In the case of the antenna for RFID 14 constituted as described above, by fixing the coil body 14b to the conductive member 14a, the characteristic value generally changes. However, because the coil body 14b is adjusted so that a predetermined characteristic value can be secured while it is wound on the front of the conductive member 14a, it is possible to reliably activate the tag 12 by transmitting radio waves at a predetermined frequency to the antenna 14 from the transceiving antenna of an interrogator (not shown). Moreover, in the case of the antenna 14, the coil body 14b for actually receiving radio waves at a predetermined frequency is already wound on the front of the conductive member 14a and a predetermined characteristic value is secured. Therefore, even if the antenna 14 is directly affixed to a metallic article, the characteristic value of the coil body 14b is not extremely changed. Therefore, a spacer, which has been necessary to affix the antenna 14 to a metallic article, is unnecessary, and it is possible to prevent the tag 12 from greatly protruding from an article and to reliably activate the tag 12 without being influenced by the metallic article.

Figure 3:
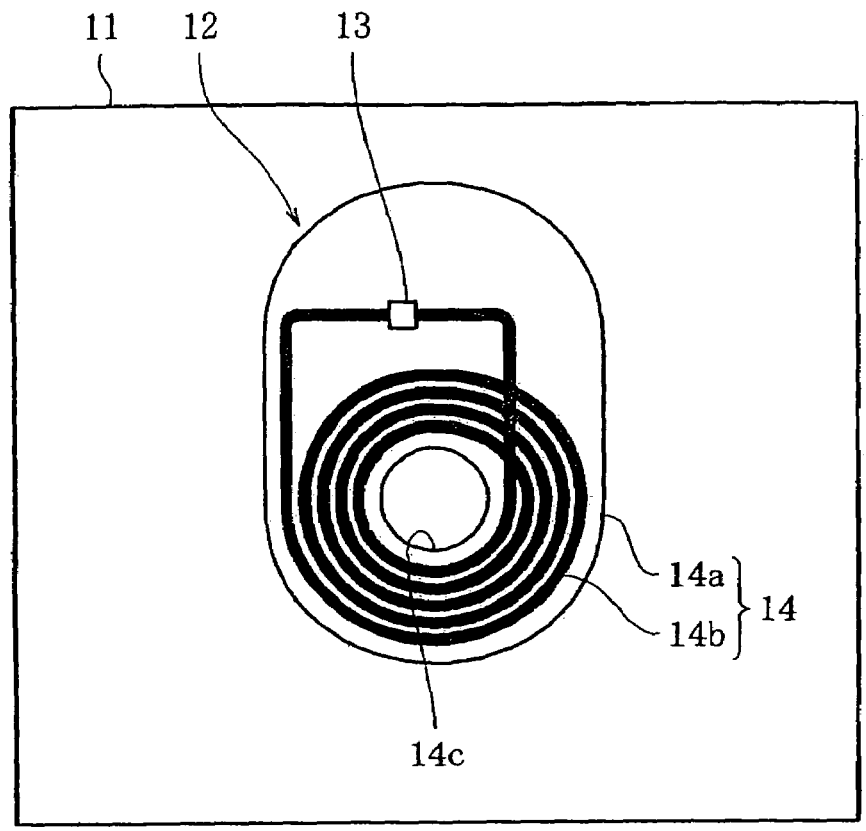
FIG. 3 is a top view of a tag including an antenna on whose conductive member a hole is formed corresponding to FIG. 1.
Figure 4:
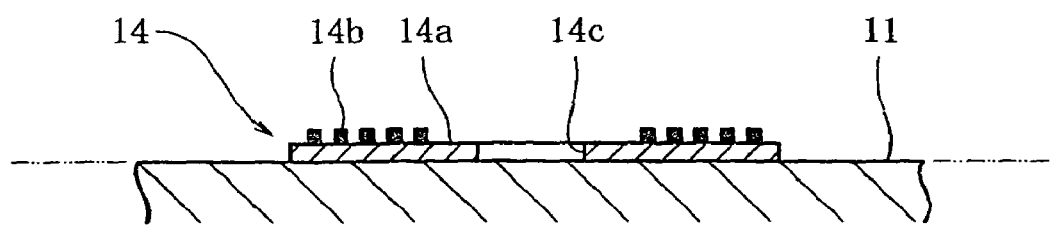
FIG. 4 is a sectional view of the antenna in FIG. 3 corresponding to FIG. 2.

As shown in FIGS. 3 and 4, by forming a hole 14c at a portion of the conductive member 14a surrounded by the coil body 14b, change of inductances and deterioration of the Q value of the coil due to the surface of an article are maintained within their tolerances when the surface is formed of a conducive material or magnetic material because the periphery of the coil is shielded by a conductive material. Moreover, when an article is made of a material allowing radio waves to pass, such as an insulating material or metallic deposited film, the sensitivity of a tag is improved because it is possible to use radio waves which pass through a hole but which cannot be used when there is no hole.

Figure 5:
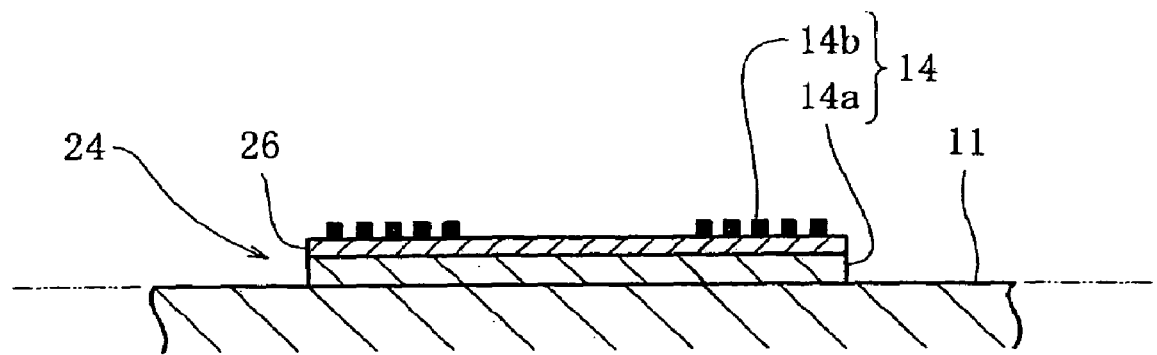
FIG. 5 is a sectional view, corresponding to FIG. 2, showing an antenna of a second embodiment in which a soft magnetic member is set.

FIG. 5 shows a second embodiment of the present invention. In FIG. 5, the same reference numerals as in FIGS. 1 and 2 are used to indicate the same components.

This embodiment uses an antenna for RFID 24 in which a flat soft magnetic member 26 is set between the conductive member 14a and coil body 14b of the antenna of the above first embodiment. In this case, because details of the conductive member 14a and coil body 14b are the same as those of the first embodiment, repetitive description is omitted.

It is preferable that the soft magnetic member 26 is formed by any one of soft magnetic materials such as a rapidly solidifying material, casting material, rolling material, forging material, and sintering material of an amorphous alloy, permalloy, magnetic steel, sillicon steel, sendust alloy, Fe—Al alloy, or soft-magnetic ferrite and the product of the magnetic permeability and the thickness shown in millimeters of the soft magnetic member 26 is 0.5 or more. Moreover, as long as the soft magnetic member 26 has magnetism, it is possible for the member 26 to be a composite material of fine particles or flakes of a metal or ferrite and plastic or rubber, or a paint film of a paint containing fine particles or flakes of a metal or ferrite. In this case, as the plastic of the compound material, it is possible to use a thermoplastic resin which is superior in workability or a thermosetting resin which is superior in heat resistance. Moreover, metallic fine particles include carbonyl iron powder, atomized powder such as iron-permalloy, and reduced iron powder. Alternatively, it is possible for the metallic flakes to be flakes obtained by fining the above powder by a ball mill and then mechanically flattening the powder or flakes obtained by making molten-metal particles of an iron-based or cobalt-based amorphous alloy collide with water-cooled copper.

Furthermore, when using a plurality of flakes made of a metal or soft-magnetic ferrite, it is allowed to constitute the soft magnetic member 26 by an adhesive sheet obtained by adhering flakes to the surface of a base-material sheet made of plastic so that the flakes closely contact with each other or constitute the soft magnetic member 26 by a laminated sheet obtained by arranging a plurality of flakes made of a metal or soft magnetic ferrite on the surface of a base-material sheet made of plastic so that the flakes closely contact with each other, covering the flakes with a cover sheet made of plastic, and adhering the base-material sheet and the cover sheet together.

Furthermore, to use a compound material as the soft magnetic member 26, it is possible to form the soft magnetic material 26 by injection-molding or compression-molding the member 26. The soft magnetic member 26 thus formed does not easily crack even if its thickness decreases because it is tough compared to a soft magnetic member formed by weak ferrite. Moreover, because fine particles of flakes of a metal or ferrite are distributed into plastic or rubber and are insulated from each other, the soft magnetic member 26 is not conductive as a whole and eddy currents do not occur even when receiving high-frequency radio waves.

When the soft magnetic member 26 is made of a composite material, it is preferable to form fine particles or flakes so that the thicknesses thereof are 74 μm or less, in order to prevent eddy currents from occuring in the fine particles or flakes of a metal or ferrite. Moreover, as a plastic, it is preferable to use any one of acrylic, polyester, polyvinylchloride, polyethylene, polystyrene, and epoxy resins. In this case, the thickness of the soft magnetic member 26 is not restricted as long as the electromagnetic shielding effect is exhibited. However, it is preferable that the thickness range between 20 and 3,000 μm for practical use.

In the case of the antenna for RFID 24 thus constituted, because magnetic fluxes of electromagnetic waves flow through the soft magnetic member 26 at a high density, a desired sensitive is obtained even if the interval between the conductive member 14a and coil body 14b is small, it is possible for the number of turns and/or spiral diameter of a coil for obtaining a predetermined conductance to be small, and the Q value is improved. As a result, a spacer, which has been required to affix the antenna 24 to a metallic article, is unnecessary, the tag 12 is prevented from protruding from an article to be managed, and it is possible to securely activate the tag 12 without being influenced by the metallic article.

Figure 6:
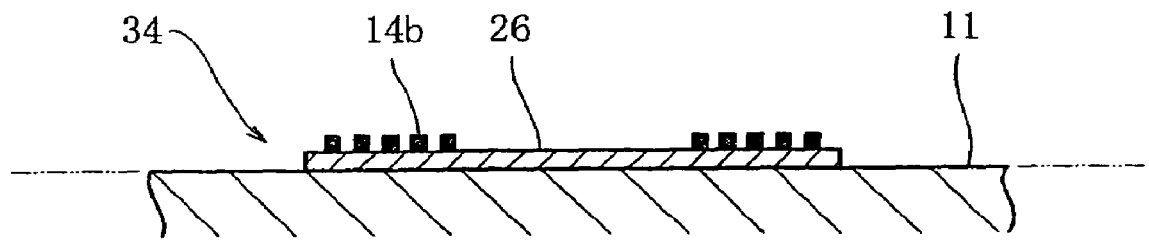
FIG. 6 is a sectional view, corresponding to FIG. 2, showing an antenna of a third embodiment in which a soft magnetic member is affixed to an article.

FIG. 6 shows the third embodiment of the present invention. In FIG. 6, reference numbers the same as those in FIGS. 1 to 5 indicate the corresponding parts.

An antenna for RFID 34 of this embodiment has a soft magnetic member 26 formed into a flat plate whose back is set to an article and a coil body 14b whose number of turns and/or spiral diameter is adjusted so as to obtain a predetermined characteristic value in a spiral shape wound and fixed on the surface of the soft magnetic member 26. Details of the coil body 14b are the same as the case of the first embodiment and the soft magnetic member 26 is the same as the case of the second embodiment. The antenna for RFID 14 thus constituted is effective when a predetermined characteristic value of the coil body 14b can be secured only through electromagnetic shielding of the soft magnetic member 26.

In the case of the antenna for RFID 34, the electromagnetic shielding of the soft magnetic member 26 ensures that a predetermined characteristic value can be reliably obtained even when affixing the antenna 34 to the surface of a metallic article, and it is possible to reliably activate the tag 12 by transmitting radio waves at a predetermined frequency to the antenna 34 from a transceiving antenna of an interrogator (not shown). Therefore, a spacer, which has been required to affix the antenna 34 to a metallic article, is unnecessary, the tag 12 can be prevented from protruding from an article to be managed, and it is possible to reliably activate the tag 12 without being influenced by the metallic article.

Figure 7:
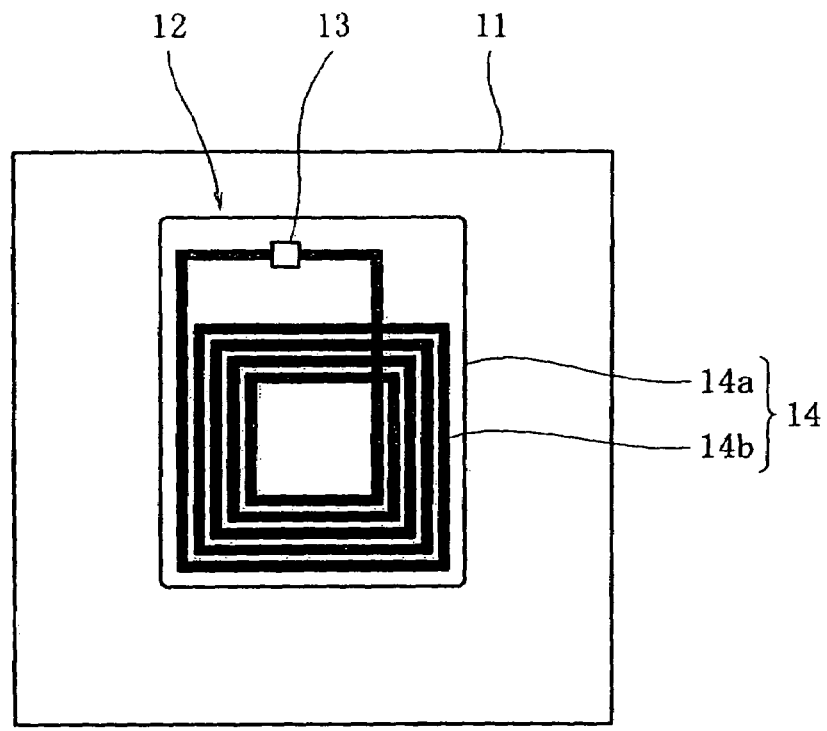
FIG. 7 is a top view, corresponding to FIG. 1, showing a case in which the body of a coil is quadrangular.

In the case of the first to third embodiments, the coil body 14b is formed into a nearly circular spiral shape. However, it is also possible to form the coil body 14b into a nearly elliptical spiral shape, a nearly square spiral shape shown in FIG. 7, or another spiral shape.

EXPERIMENTAL EXAMPLES

Next, Experimental Examples of the present invention are described below in detail together with Comparative Examples.

Experimental Example 1

As shown in FIGS. 1 and 2, a coil body with an outer diameter of 50 mm and an inner diameter of 49 mm was made by winding a coated copper wire having a diameter of 0.2 mm four to five times. Moreover, a mild-steel plate having a size of 100×100 mm and a thickness of 0.16 mm was prepared as an article and a non-metallic acrylic plate having the same shape and size as the mild-steel plate was also prepared for comparison. As a conductive member, an aluminum plate having a size of 50×50 mm and a thickness of 0.2 mm was affixed to the surfaces of the mild-steel plate and acrylic plate, respectively. Then, the L1 value and the Q1 value of the coil body were measured by directly affixing the coil body at the surface of the aluminum plate which is affixed on the mild-steel plate, or by maintaining a predetermined interval to the surface of the aluminum plate. Thereafter, the values of L2 and Q2 were measured by directly affixing the coil body at the surface of the aluminum plate which is affixed on the acrylic plate, or by maintaining a predetermined interval to the surface of the aluminum plate.

Experimental Example 2

A soft magnetic member was set between the coil body and aluminum plate of the Experimental Example 1. The soft magnetic member used a member having an outer diameter of 60 mm and a thickness of 0.34 mm which was obtained by injection-molding a composite material made of 72% of carbonyl iron and polyethylene and then compressing the moulded composite material. The coil body of the Experimental Example 1 was brought into close contact with the surface of the soft magnetic member 26 to measure the L1 value and the Q1 value of the coil body by directly bringing the back of the soft magnetic member 26 into contact with the surface of an aluminum plate set on the mild-steel plate of the Experimental Example 1 or setting the soft magnetic member 26 by maintaining a predetermined interval. Then, the L2 value and the Q2 value of the coil body were measured by directly bringing the back of the soft magnetic member 26 into contact with the surface of the aluminum plate set on the acrylic plate of the Experimental Example 1 or disposing the soft magnetic member 26 by maintaining a predetermined interval therebetween. Then, L1/L2 was obtained.

Experimental Example 3

L1 and Q1 values and L2 and Q2 values of a coil body were measured in a manner similar to that in Experimental Example 1, except that an aluminum foil having a thickness of 10 μm was used instead of the aluminum plate of the Experimental Example 1, and L1/L2 was determined.

Experimental Example 4

L1 and Q1 values and L2 and Q2 values of a coil body were measured in a manner similar to that in Experimental Example 1, except that an aluminum foil having a thickness of 10 μm was used instead of the aluminum plate of the Experimental Example 2, and L1/L2 was determined.

Comparative Example 1

L1 and Q1 values of a coil body were measured by setting the coil body to the surface of a mild-steel plate serving as the article of the Experimental Example 1 directly or by maintaining a predetermined interval therebetween. Moreover, L2 and Q2 values of a coil body were measured by disposing the coil body at the surface of an acrylic plate directly or by maintaining a predetermined interval therebetween. Then, L1/L2 was determined. Table 1 shows the above measurement results.

TABLE 1

| | | | Acrylic plate | | Mild-steel plate | | |
|---|---|---|---|---|---|---|---|
| | Article | | L2 (μH) | Q2 | L1 (μH) | Q1 | L1/L2 |
| Experimental Example 1 | Gap between aluminum plate and coil body | 0 | 0.667 | 15.5 | 0.677 | 15.2 | 99 |
| | | 0.607 | 1.163 | 25.1 | 1.204 | 31.7 | 97 |
| | | 1.214 | 1.482 | 45.5 | 1.511 | 34.4 | 98 |
| | | 1.821 | 1.694 | 52.7 | 1.702 | 49.4 | 100 |
| | | 2.428 | 1.892 | 57.2 | 1.862 | 54.9 | 102 |
| Experimental Example 2 | Gap between aluminum plate and soft magnetic member | 0 | 1.804 | 40.0 | 1.775 | 38.5 | 102 |
| | | 0.607 | 2.019 | 43.9 | 2.021 | 42.2 | 100 |
| | | 1.214 | 2.187 | 46.9 | 2.182 | 44.6 | 100 |
| | | 1.821 | 2.338 | 47.8 | 2.330 | 47.0 | 100 |
| | | 2.428 | | | | | |
| Experimental Example 3 | Gap between aluminum foil and coil body | 0 | 0.541 | 8.5 | 0.567 | 8.8 | 95 |
| | | 0.607 | 1.187 | 27.7 | 1.172 | 27.5 | 101 |
| | | 1.214 | 1.547 | 39.1 | 1.499 | 37.3 | 103 |
| | | 1.821 | 1.763 | 45.3 | 1.749 | 45.0 | 101 |
| | | 2.428 | 1.905 | 48.5 | 1.879 | 47.8 | 101 |
| Experimental Example 4 | Gap between aluminum foil and soft magnetic member | 0 | 1.855 | 33.1 | 1.969 | 22.0 | 94 |
| | | 0.607 | 2.129 | 36.4 | 2.146 | 36.6 | 99 |
| | | 1.214 | 2.281 | 38.2 | 2.329 | 37.9 | 98 |
| | | 1.821 | 2.456 | 39.9 | 2.507 | 39.1 | 98 |
| | | 2.428 | 2.586 | 39.3 | 2.549 | 39.5 | 101 |
| Comparative Example 1 | Gap between metallic plate and coil body | 0 | 2.968 | 77.2 | 1.213 | 6.8 | 245 |
| | | 0.607 | 2.968 | 77.2 | 1.359 | 9.3 | 218 |
| | | 1.214 | 2.968 | 77.2 | 1.612 | 14.5 | 184 |
| | | 1.821 | 2.968 | 77.2 | 1.801 | 19.3 | 165 |
| | | 2.428 | 2.968 | 77.2 | 1.963 | 24.1 | 151 |

The measurement frequency used 13.56 MHz.

As shown in Table 1, in the case of the Comparative Example 1, it was found that the value of L1/L2 was large, the change rate is large when directly affixing a coil body on a metal, and a tag cannot be activated when the coil body is actually used for the tag. Moreover, the fact is clarified that as the interval between the coil body and the metal increases, the change rate decreases and a tag cannot be activated unless the conventional antenna constituted by only the coil body is affixed to the metal surface through a spacer having a predetermined thickness.

In the case of the Experimental Examples 1 and 3 in which an aluminum plate or aluminum foil is set between a metallic plate and a coil body, it was found that the value of L1/L2 showing a change of L extremely decreases. Therefore, even if directly affixing an antenna for RFID to which a coil body whose number of turns and/or spiral diameter is adjusted so as to obtain a predetermined characteristic value while the coil body is wound on the surface of a conductive member is affixed to a metallic article, it can be expected that functions of the antenna can be exhibited and it was found that the present invention is effected.

Moreover, in the case of the Experimental Examples 2 and 4 in which a soft magnetic member is further disposed between an aluminum plate or aluminum foil and a coil body, it was found that the value of L1/L2 was extremely decreased compared to the case of the Comparative Example 1 and the Q value was improved compared to the case of the Experimental Examples 1 and 3. Q values are increased, loss due to eddy currents are decreased, and characteristics of an antenna for RFID are improved. Therefore, in the case of the present invention in which a soft magnetic member is disposed between a conductive member and a coil body, it was found that functions of an antenna can be sufficiently improved.

Now, an Experimental Example showing whether a tag using an antenna of the present invention actually operates is described below in detail together with a Comparative Example.

Experimental Example 5

As shown in FIGS. 1 and 2, a coil body having an outer diameter of 50 mm and an inner diameter of 49 mm was made by winding a coated copper wire having a diameter of 0.2 mm four to five times. An aluminum foil having a thickness of 10 µm and a size of 60×60 mm was prepared as a conductive member. An RFID tag was obtained by directly affixing the coil body to the surface of the aluminum foil and electrically connecting an IC chip to the coil body. The tag was used as the Experimental Example 5

Experimental Example 6

A coil body the same as that used for the Experimental Example 5 was made in accordance with the same procedures as in the case of the Experimental Example 5. Moreover, an aluminum foil having the same shape and same size as the case of the Experimental Example 5 and an acrylic plate having the same outer-diameter as the aluminum foil and a thickness of 0.607 mm were prepared. An RFID tag was obtained by affixing the coil body to the surface of the aluminum foil through the acrylic plate and electrically connecting an IC chip to the coil body. Thus, the tag to which the coil body was affixed by maintaining an interval of 0.607 mm from the aluminum foil was used as the Experimental Example 6.

Experimental Example 7

A coil body the same as that used for the Experimental Example 5 was made in accordance with the same procedures as in the case of the Experimental Example 5. Moreover, an aluminum foil having the same shape and size as the case of the Experimental Example 5 was prepared to form a circular hole having a diameter of 40 mm at the center of the aluminum foil. A coil body was affixed to the surface of the aluminum foil so as to surround the circular hole and an RFID tag was obtained by electrically connecting an IC chip to the coil body. The tag in which the coil body was affixed to the aluminum foil on which the circular hole is formed was used as the Experimental Example 7.

Experimental Example 8

A coil body the same as that used for the Experimental Example 5 was made in accordance with the same procedures as in the case of the Experimental Example 5. Moreover, an aluminum foil serving as a conductive member having the same shape and size as the case of the Experimental Example 5 and a composite material including carbonyl iron having a thickness of 0.34 mm and a size of 60×60 mm serving as a soft magnetic member were prepared. A coil body was affixed to the surface of the aluminum foil through the compound material and an RFID tag was obtained by electrically connecting an IC chip to the coil body. Thus, the tag, in which a flat soft magnetic member was disposed between the conductive member and coil body, was used as the Experimental Example 8.

Experimental Example 9

A coil body the same as that used for the Experimental Example 5 was made in accordance with the same procedures as in the case of the Experimental Example 5. Moreover, an aluminum foil serving as a conductive member having the same shape and size as the case of the Experimental Example 5 was prepared and a paint containing flaky magnetic powder was applied to the aluminum foil and was dried to form a paint film having a thickness of 0.2 mm serving as a soft magnetic member on the surface of the aluminum foil. The coil body was affixed to the surface of the paint film and an RFID tag was obtained by electrically connecting an IC chip to the coil body. The tag in which a paint film serving as a soft magnetic member was formed between the conductive member and coil body was used as the Experimental Example 9.

Experimental Example 10

A coil body the same as that used for the Experimental Example 5 was made in accordance with the same procedures as in the case of the Experimental Example 5. Moreover, a composite material containing carbonyl iron having a thickness of 0.34 mm and a size of 60×60 mm was prepared as a soft magnetic member. A paint containing silver powder was applied to the back of the composite material and was dried to form a paint film serving as a conductive member having a thickness of 0.15 mm on the back of the composite material. Moreover, the coil body was affixed to the surface of the composite material and an RFID tag was obtained by electrically connecting an IC chip to the coil body. The tag in which the composite material serving as a soft magnetic member was disposed between the paint film and coil body was used as the Experimental Example 10.

Experimental Example 11

A coil body the same as that used for the Experimental Example 5 was made in accordance with the same procedures as in the case of the Experimental Example 5. A paint film having a thickness of 0.15 mm serving as a conductive member was formed on the back of a composite material in accordance with the same procedure as the case of the Experimental Example 10. The paint film is peeled off the compound material. A coil body was fixed to the surface of the paint film serving as a conductive member and an RFID tag was obtained by electrically connecting an IC chip to the coil body. The tag having the paint film serving as a conductive member was used as the Experimental Example 11.

Experimental Example 12

A coil body the same as that used for the Experimental Example 5 was made in accordance with the same procedures as in the case of the Experimental Example 5. A discoid ferrite plate having a thickness of 1 mm and a diameter of 60 mm was prepared as a conductive member. The coil body was directly affixed to the surface of the ferrite plate and an RFID tag was obtained by electrically connecting an IC chip to the coil body. The tag was used as the Experimental Example 12.

Comparative Example 2

A coil body the same as that used for the Experimental Example 5 was made in accordance with the same procedures as in the case of the Experimental Example 5. An RFID tag was obtained by electrically connecting an IC chip to the coil body. The tag constituted by the coil body and IC chip was used as the Comparative Example 2.

Comparative Example 3

A coil body obtained by winding a coated copper wire having a diameter of 0.2 mm on a composite material containing carbonyl iron having a thickness of 1 mm and a size of 40×40 mm ten times was made. An RFID tag was obtained by electrically connecting an IC chip to the coil body. The tag constituted by the bobbin-type coil body and IC chip was used as the Comparative Example 3.

Comparative Test and Evaluation

Thicknesses of the tags of the Experimental Examples 5 to 11 and Comparative Examples 2 and 3 were measured and L3 and Q3 values of coil bodies were measured by arranging the tags on an acrylic plate. Moreover, it was determined whether the taf was normally operated by bringing the transceiving antenna 21a of the interrogator 21 shown in FIG. 8 close to the tag up to 30 mm.

Figure 8:
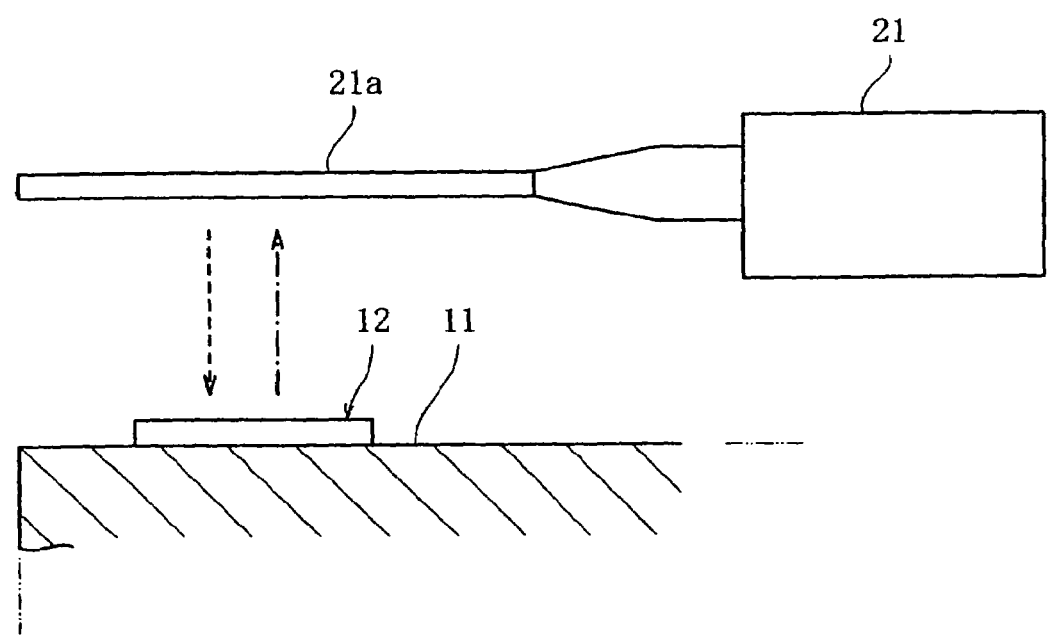
FIG. 8 is an illustration showing a state of confirming operations of a tag of an embodiment.

Thereafter, as shown in FIG. 8, these tags 12 were arranged on an iron plate having a thickness of 1 mm serving as the article 11 to measure L4 and Q4 values of the coil bodies. Then, it was confirmed whether the tag was normally operated by bringing the transceiving antenna 21a of the interrogator 21 near to the tag 12 up to 30 mm.

The measured values of L3, L4 and Q3, Q4, and the effect of the operation (operable or inopereble) is listed in Table 2.

TABLE 2

|  | Configuration of tag | Thickness (mm) | Upper stage L3 ($\mu$H) Lower stage L4 ($\mu$H) | Upper stage Q3 Lower stage Q4 | Effect of operation |
| --- | --- | --- | --- | --- | --- |
| Experimental Example 5 | Aluminum foil | 0.45 | 0.541 | 8.5 | Operable |
|  |  |  | 0.567 | 8.8 | Operable |
| Experimental Example 6 | Aluminum foil and gap | 1.06 | 1.187 | 27.7 | Operable |
|  |  |  | 1.172 | 27.5 | Operable |
| Experimental Example 7 | Circular-hole-provided aluminum foil | 0.45 | 1.127 | 27.0 | Operable |
|  |  |  | 1.067 | 13.8 | Operable |
| Experimental Example 8 | Compound material and aluminum foil | 0.85 | 1.855 | 33.1 | Operable |
|  |  |  | 1.969 | 22.0 | Operable |
| Experimental Example 9 | Magnetic paint film and aluminum foil | 0.7 | 1.754 | 36.7 | Operable |
|  |  |  | 1.844 | 36.8 | Operable |
| Experimental Example 10 | Compound material and conductive paint film | 0.8 | 1.790 | 36.8 | Operable |
|  |  |  | 1.8207 | 36.9 | Operable |
| Experimental Example 11 | Conductive paint film | 0.5 | 0.808 | 11.4 | Operable |
|  |  |  | 0.781 | 12.8 | Operable |
| Experimental Example 12 | Ferrite plate | 1.5 | 4.611 | 60.3 | Operable |
|  |  |  | 4.261 | 38.9 | Operable |
| Comparative Example 2 | Coil only | 0.4 | 2.968 | 77.2 | Operable |
|  |  |  | 1.213 | 6.8 | Inoperable |
| Comparative Example 3 | Bobbin-type coil | 2.0 | 4.356 | 88.4 | Operable |
|  |  |  | 4.449 | 60.4 | Inoperable |

The measurement frequency used 13.56 MHz.

From Table 2, it was found that changes of L and Q when arranging tags on a metal are large in the case of the Comparative Example 2 and the tags when arranged on the metal do not operate normally. Moreover, in the case of the Comparative Example 3, changes of L and Q when arranging tags on a metal are small compared to the case of the Comparative Example 2, but the tags did not operate normally when arranged on the metal. It is estimated that the above-described matter is caused by the fact that because the magnetic-core direction of the so-called bobbin-type coil coincides with the axial-core direction of the coil, radio waves cannot be transmitted from the transceiving antenna of an interrogator approached from the direction orthogonal to the surface of a metal serving as an article.

In the case of the Experimental Examples 5 to 9 respectively having a conductive member formed by an aluminum foil and the Experimental Examples 10 and 11 respectively having a conductive member formed by a conductive paint film, it was found that values of L and Q are relatively small, but their changes are small, and tags when arranged on a metal operate normally. Moreover, it was found that values of L and Q are improved in the case of the Experimental Example 6 provided with a gap and the Experimental Example 7 in which the circular hole is formed on the aluminum foil compared to the case of the Experimental Example 5 in which the coil body is directly fixed to the aluminum foil. Furthermore, in the case of the Experimental Examples 8 to 10 in each of which the soft magnetic member is set between the conductive member and coil body, it was found that values of L and Q are improved. Therefore, in the case of the present invention in which a soft magnetic member is set between a conductive member and a coil body, it was found that functions of an antenna are sufficiently improved.

Furthermore, in the case of the Experimental Example 12 in which the coil body is fixed to the surface of the ferrite plate serving as a soft magnetic member, it was found that values of L and Q are further improved and the tag operate normally. Therefore, as long as a predetermined characteristic value of a coil body can be secured only through electromagnetic shielding of a soft magnetic member, it was found that a predetermined characteristic value can be reliably obtained even when a tag is affixed to the surface of a metallic article and the tag can be operated normally.

INDUSTRIAL APPLICABILITY

As described above, according to the present invention, the characteristic value of a coil body is not extremely changed even when directly affixing an antenna on a metallic article to be managed, and a spacer, which has been required to affix an antenna to a metallic article, is unnecessary, and a tag can be prevented from greatly protruding from an article to be managed.

Moreover, a coil body is electromagnetically shielded by a soft magnetic member set between a conductive member and the coil body, the Q value of the coil body is improved, adjustment of the number of turns and/or spiral diameter of the coil body to be performed to obtain a predetermined characteristic value becomes relatively easy, and it is possible to reliably obtain the predetermined characteristic value even if affixing the antenna to the surface of a metallic article.

Furthermore, by affixing the back of a soft magnetic member to an article and affixing a spiral coil body to the surface of the soft magnetic member directly or by maintaining a predetermined interval therebetween, when transmitting radio waves while affixing an antenna to a metallic article, eddy currents are not generated at a metallic portion because the soft magnetic member prevents the radio waves from passing through the metallic portion. As a result, a tag is activated, a spacer, which has been required, is unnecessary, even if an article is made of metal, and it is possible to prevent the antenna from contacting with a neighboring object while the article is transported.

The invention claimed is:

1. An antenna for RFID (Radio Frequency Identification) configured to be electrically connected to an IC (Integrated Circuit) chip or capacitor and configured to be affixed to an article, comprising:
    a planar conductive member having a first side configured to be mounted on the article; and
    a coil body configured with coil turns and mounted on or at a second side of the conductive member which is opposite to the first side of the conductive member,
    wherein the number of the coils turns and diameter of said coil body are adjusted such that the characteristic of said coil body has a predetermined value, and the coil body is shielded by conductive member,
    wherein said conductive member is a sheet, plate, or foil, having a spiral shape and two ends connected to each other.

2. The antenna for RFID according to claim 1, wherein electrical resistance between both ends of an area having a width of 1 cm and a length of 1 cm of said conductive member in a longitudinal direction is 5Ω or less.

3. The antenna for RFID according to claim 1, wherein said conductive member is a conductive paint film applied to a planar nonconductive member, and
    said coil body is affixed to a surface of said nonconductive member.

4. The antenna for RFID according to claim 1, wherein said conductive member is laminated on a planar nonconductive member, and
    said coil body is affixed to a surface of said nonconductive member.

5. The antenna for RFID according to claim 1, wherein a gap between said conductive member and said coil body ranges between 0.01 and 5 mm.

6. The antenna for RFID according to claim 1, wherein a hole is formed at a portion of said conductive member surrounded by said coil body.

7. The antenna for RFID according to claim 1, wherein a soft magnetic member is disposed between said conductive member and said coil body.

8. The antenna for RFID according to claim 7, wherein said soft magnetic member has a value of 0.5 or more in a product of magnetic permeability and thickness in millimeters of said soft magnetic member.

9. The antenna for RFID according to claim 7, wherein said soft magnetic member is formed of at least one of a rapidly solidifying material, casting material, rolling material, forging material, and sintering material each including at least one of an amorphous alloy, permalloy, magnetic steel, silicon steel, sendust alloy, Fe—Al alloy, and soft-magnetic ferrite.

10. The antenna for RFID according to claim 7, wherein said soft magnetic member includes a composite material of (1) fine particles or flakes of a metal or ferrite, and (2) plastic or rubber, or
    said soft magnetic member includes a film of a paint containing fine particles or flakes of a metal or ferrite.

11. The antenna for RFID according to claim 7, wherein said soft magnetic member is an adhesive sheet obtained by adhering a plurality of flakes, comprised of a metal or soft magnetic ferrite, to a surface of a base-material sheet comprised of plastic so that the flakes closely contact each other.

12. The antenna for RFID according to claim 11, wherein said soft magnetic member is further obtained by covering the flakes with a cover sheet comprised of plastic and adhering said base-material sheet and said cover sheet together.

13. An antenna for RFID (Radio Frequency Identification) configured to be electrically connected to an IC (Integrated Circuit) chip or capacitor and configured to be affixed to an article, comprising:
    a planar soft magnetic member having a first side configured to be mounted on the article; and
    a coil body including coil turns and mounted on or at a second side of the soft magnetic member which is opposite to the first side of said soft magnetic member, wherein the number of the coil turns and diameter of said coil body are set such that a characteristic of said coil body has a predetermined value, and the coil body is shielded by said soft magnetic member from the article, wherein said soft soft magnetic member is an adhesive sheet obtained by adhering a plurality of flakes, comprised of a metal or soft magnetic ferrite, to a surface of a base-material sheet made of plastic so that the flakes closely contact each other.

14. The antenna for RFID according to claim 13, wherein said soft magnetic member has a value of 0.5 or more in a product of magnetic permeability and thickness in millimeters of said soft magnetic member.

15. The antenna for RFID according to claim 13, wherein said soft magnetic member is formed of at least one of a rapidly solidifying material, casting material, rolling material, forging material, and sintering material of each including at least one of an amorphous alloy, permalloy, magnetic steel, silicon steel, sendust alloy, Fe—Al alloy, or soft-magnetic ferrite.

16. The antenna for RFID according to claim 13, wherein said soft magnetic member includes a composite material of (1) fine particles or flakes of a metal or ferrite, and (2) plastic or rubber, or said soft magnetic member includes a film of a paint containing fine particles or flakes of a metal or ferrite.

17. The antenna for RFID according to claim 16, wherein said soft magnetic member is further obtained by covering the flakes with a cover sheet comprised of plastic and adhering said base-material sheet and said cover sheet together.

18. The antenna for RFID according to claim 16, wherein the hole permits the electromagnetic waves to more easily pass through said conductive member.

* * * * *